(12) United States Patent
Kehoe

(10) Patent No.: US 10,788,871 B1
(45) Date of Patent: Sep. 29, 2020

(54) SYSTEMS AND METHODS FOR ISOLATING CAPACITANCE FROM LIQUID CRYSTAL DISPLAY BACKLIGHT CIRCUIT

(71) Applicant: Dell Products L.P., Round Rock, TX (US)

(72) Inventor: Daniel W. Kehoe, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/570,786

(22) Filed: Sep. 13, 2019

(51) Int. Cl.
- *G06F 1/26* (2006.01)
- *G09G 3/34* (2006.01)
- *H05B 47/10* (2020.01)

(52) U.S. Cl.
CPC ............ *G06F 1/26* (2013.01); *G09G 3/3406* (2013.01); *H05B 47/10* (2020.01); *G06F 1/263* (2013.01); *G09G 2330/021* (2013.01)

(58) Field of Classification Search
CPC . G06F 1/26; G06F 1/263; G06F 1/266; G06F 3/00; H05B 47/10; G09G 3/34; G09G 3/3406
See application file for complete search history.

(56) References Cited

U.S. PATENT DOCUMENTS

| | | | | |
|---|---|---|---|---|
| 2006/0061338 A1* | 3/2006 | Keller | .................... | H02M 1/32 323/222 |
| 2012/0056864 A1* | 3/2012 | Aioanei | ............... | G09G 3/3696 345/212 |
| 2013/0009483 A1* | 1/2013 | Kawate | ................... | H02S 50/10 307/77 |
| 2014/0218007 A1* | 8/2014 | Vogman | .............. | G06F 11/3024 324/76.11 |
| 2017/0185094 A1* | 6/2017 | Atkinson | ............... | H02J 7/0063 |
| 2019/0041934 A1* | 2/2019 | Tan | ........................ | G06F 1/1637 |

* cited by examiner

*Primary Examiner* — Thai Pham
(74) *Attorney, Agent, or Firm* — Jackson Walker L.L.P.

(57) ABSTRACT

An information handling system may include a plurality of information handling resources and a power subsystem for providing electrical energy to the plurality of information handling resources, the power subsystem comprising a source of electrical energy for supplying a supply voltage to an electrical node, a first set of one or more voltage regulators, and a diode coupled at its anode to the electrical node and coupled at its cathode to respective inputs of each of the first set of one or more voltage regulators in order to isolate capacitances associated with the inputs of the first set of one or more voltage regulators from the electrical node.

18 Claims, 2 Drawing Sheets

SYSTEMS AND METHODS FOR ISOLATING CAPACITANCE FROM LIQUID CRYSTAL DISPLAY BACKLIGHT CIRCUIT

TECHNICAL FIELD

The present disclosure relates in general to information handling systems, and more particularly to isolating capacitance from a liquid crystal display backlight circuit in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A number of standards and regulations are used or are applied to the manufacture and use of information handling systems and other electrical and electronic systems, including, without limitation, electrical safety standards and regulations. For example, European Union directive ATEX 95 regulates equipment and protective systems intended for use in potentially explosive atmospheres, and European Union directive ATEX 137 regulates minimum requirements for improving the safety and health protection of workers potentially at risk from explosive atmospheres.

These ATEX directives provide that circuits to be deemed safe must satisfy minimum spacing rules. Conformal coatings may be used to relax such spacing rules, but such coatings are not practical on some circuits such as third party liquid crystal display (LCD) backlighting systems. In such systems, some voltage rails may have high enough voltages that, in accordance with the ATEX directives, capacitances on such rails must be held to certain maximums to prevent a discharge (e.g., spark) with sufficient energy to ignite an explosive atmosphere. However, reducing capacitances on such electrical voltage rails may lead to unstable operation.

SUMMARY

In accordance with the teachings of the present disclosure, one or more disadvantages and problems associated with existing power architectures in display assemblies may be reduced or eliminated.

In accordance with embodiments of the present disclosure, an information handling system may include a plurality of information handling resources and a power subsystem for providing electrical energy to the plurality of information handling resources, the power subsystem comprising a source of electrical energy for supplying a supply voltage to an electrical node, a first set of one or more voltage regulators, and a diode coupled at its anode to the electrical node and coupled at its cathode to respective inputs of each of the first set of one or more voltage regulators in order to isolate capacitances associated with the inputs of the first set of one or more voltage regulators from the electrical node.

In accordance with these and other embodiments of the present disclosure, a power system for providing electrical energy to a plurality of electrical components may include a source of electrical energy for supplying a supply voltage to an electrical node, a first set of one or more voltage regulators, and a diode coupled at its anode to the electrical node and coupled at its cathode to respective inputs of each of the first set of one or more voltage regulators in order to isolate capacitances associated with the inputs of the first set of one or more voltage regulators from the electrical node.

In accordance with these and other embodiments of the present disclosure, a method may include coupling a diode at its anode to an electrical node configured to receive a supply voltage from a source of electrical energy and coupling the diode at its cathode to respective inputs of each of the first set of one or more voltage regulators in order to isolate capacitances associated with the inputs of the first set of one or more voltage regulators from the electrical node.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
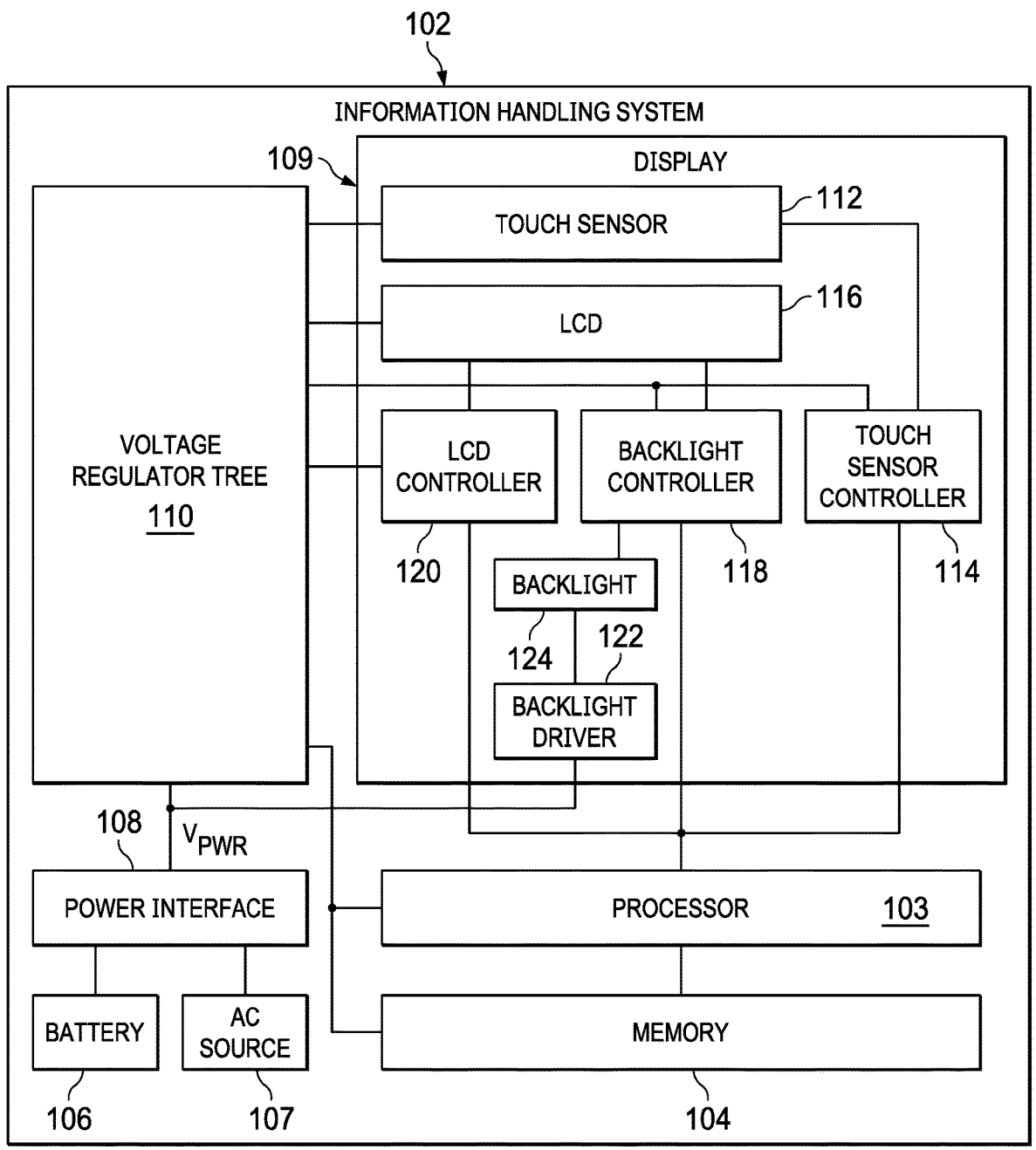
FIG. 1 illustrates a block diagram of an example information handling system, in accordance with certain embodiments of the present disclosure.
Figure 2:
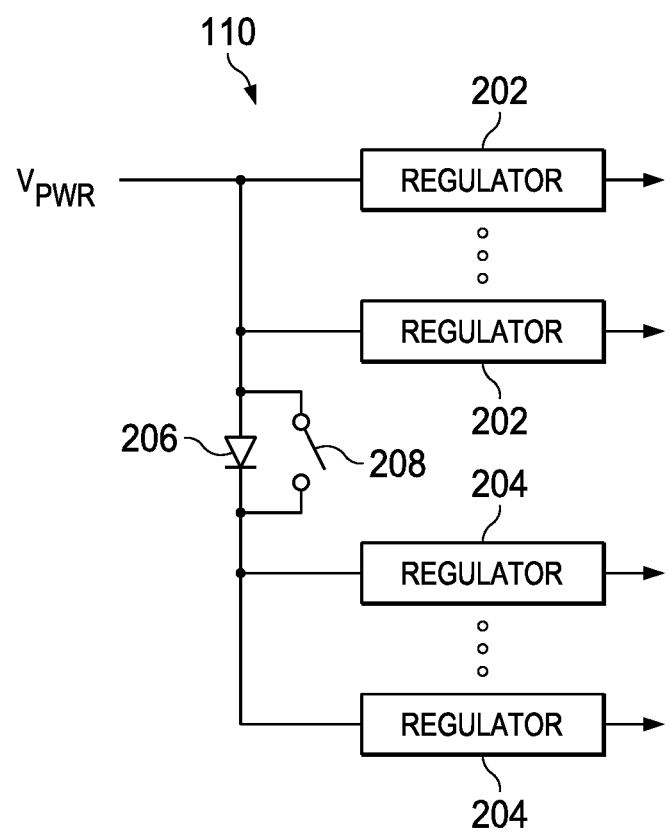
FIG. 2 illustrates a block diagram of an example voltage regulator tree, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may be a mobile device sized and shaped to be readily transported and carried on a person of a user of information handling system 102 (e.g., a notebook or laptop computer, etc.). As depicted in FIG. 1, information handling system 102 may include a processor 103, a memory 104 communicatively coupled to processor 103, a battery 106, an alternating current (AC) source 107, a power interface 108, a display 109, and a voltage regulator tree 110.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Battery 106 may comprise any system, device, or apparatus configured to store energy which may be used by information handling system 102 to power components of information handling system 102 to perform the functionality thereof. In some embodiments, battery 106 may comprise an electrochemical cell configured to convert stored chemical energy into electrical energy.

AC source 107 may comprise any system, device, or apparatus configured to provide a direct current (DC) power source derived from an AC power source (e.g., an AC adapter configured to receive an AC input and convert such AC input to a DC voltage).

Power interface 108 may comprise any system, device, or apparatus configured to serve as an electrical interface between power sources (e.g., battery 106 and AC source 107) and voltage regulator tree 110. Accordingly, power interface 108 may include any suitable combination of connectors, cabling, cabling harnesses, and/or other components to provide such an electrical interface. In some embodiments, power interface 108 may be configured to, when an AC input is present, output a voltage $V_{PWR}$ which is provided by AC source 107, and when an AC input is not present, output a voltage $V_{PWR}$ which is provided by battery 106, in order to provide electrical energy to components of information handling system 102.

Display 109 may comprise any instrumentality or aggregation of instrumentalities by which a user may interact with information handling system 102. For example, display 109 may permit a user to input data and/or instructions into information handling system 102, and/or otherwise manipulate information handling system 102 and its associated components. Display 109 may also permit information handling system 102 to communicate data to a user, e.g., by way of a display device. In some embodiments, display 109 may comprise a touch-screen display. When implemented as a touch-screen display, display 109 may comprise touch sensor 112, touch sensor controller 114, liquid crystal display (LCD) 116, backlight controller 118, LCD controller 120, backlight driver 122, and backlight 124.

As known in the art, touch sensor 112 may include any system, device, or apparatus configured to detect tactile touches (e.g., by a human finger, a stylus, etc.) on touch sensor 112 and generate one or more signals indicative of the occurrence of such touches and/or the locations of such touches on the touch sensor 112. In some embodiments, touch sensor 112 may be a capacitive touch sensor configured to detect changes in capacitance induced by tactile touches. In these and other embodiments, touch sensor 112 may be constructed from substantially optically transparent material and placed over LCD 116 or another display apparatus, allowing a user to view graphical elements of the touch display while interacting with touch sensor 112.

Touch sensor controller 114 may be communicatively coupled between touch sensor 112 and processor 103, and comprise any system, device, or apparatus configured to process signals indicative of touches received from touch sensor 112 and translate such signals into signals which may be processed by processor 103. In addition, touch sensor controller 114 may control one or more operating conditions associated with touch sensor 112, including the rate of sampling touches, whether touch sensor 112 is powered on or enabled, and/or other operating conditions.

LCD 116 may comprise any suitable system, device, or apparatus configured to display human-perceptible graphical data and/or alphanumeric data to display 109. As is known in the art, LCD 116 may include an array of liquid crystals configured to modulate light generated by backlight 124 in order to create graphical data and/or alphanumeric data on LCD 116. Although FIG. 1 specifically depicts LCD 116, in some embodiments display 109 may include a display device other than an LCD.

Backlight controller 118 may be communicatively coupled between LCD 116 and processor 103, and comprise any system, device, or apparatus configured to control operation of backlight 124, including controlling an intensity of light generated by such backlight.

LCD controller 120 may be communicatively coupled between LCD 116 and processor 103, and may comprise any system, device, or apparatus configured to, based on graphical data communicated from processor 103 to LCD controller 120, control individual liquid crystals of LCD 116 in order to modulate the light generated by backlight 124, thus creating a display of graphical data and/or alphanumeric data on LCD 116.

Backlight driver 122 may comprise any system, device, or apparatus configured to receive voltage $V_{PWR}$ from power interface 108 and condition such voltage to electrically drive backlight 124.

Backlight 124 may comprise any system, device, or apparatus (e.g., a plurality of light-emitting diodes) configured to generate light that may be modulated by LCD 116 in order to generate a display of graphical and/or alphanumeric data.

Voltage regulator tree 110 may comprise any suitable system, device, or apparatus configured to receive a voltage as an input, and generate from such voltage one or more regulated output voltages to power components of information handling system 102 that may have varying input voltage requirements from each other. Accordingly, voltage regulator tree 110 may include one or more direct current-to-direct current voltage converters, including without limitation one or more buck converters, one or more buck-boost converters, and one or more boost converters. An example of voltage regulator tree 110 is shown in FIG. 2 below.

In addition to processor 103, memory 104, battery 106, interface 108, display 109, and voltage regulator tree 110, information handling system 102 may include one or more other information handling resources. An information handling resource may include any component, system, device or apparatus of an information handling system, including without limitation, a processor (e.g., processor 103), bus, memory (e.g., memory 104), I/O device and/or interface, storage resource (e.g., hard disk drives), network interface, electro-mechanical device (e.g., fan), display, power supply, and/or any portion thereof.

As shown in FIG. 1, backlight driver 122 may receive voltage $V_{PWR}$ directly from power interface 108 without additional regulation from voltage regulator tree 110, while other components of information handling system 102 may receive regulated voltages generated by voltage regulators of voltage regulator tree 110. Using existing approaches, the various regulators within voltage regulator tree 110 may contribute significant capacitance to the electrical node on which voltage $V_{PWR}$ is driven, placing such node at risk of causing a discharge (e.g., spark) with sufficient energy to ignite an explosive atmosphere. Thus, as described in greater detail below, voltage regulator tree 110 may be configured to isolate some or all of the capacitance at the inputs of the voltage regulators of voltage regulator tree 110 in order to reduce or eliminate such risk.

FIG. 2 illustrates a block diagram of example voltage regulator tree 110, in accordance with certain embodiments of the present disclosure. As shown in FIG. 2, voltage regulator tree 110 may include one or more higher-voltage regulators 202, one or more lower-voltage regulators 204, and an isolation diode 206 coupled at its anode to supply voltage $V_{PWR}$ provided by power interface 108, also coupled at its anode to inputs of the higher-voltage regulators 202 and coupled at its cathode to inputs of the lower-voltage regulators 204. Accordingly, circuits (e.g., backlight driver 122) that receive voltage $V_{PWR}$ and require protection from a potentially-explosive discharge may be isolated from the capacitances associated with the inputs of lower-voltage regulators 204. Further, higher-voltage regulators 202, which may not be capable of tolerating an input voltage which is a diode threshold drop below that of supply voltage $V_{PWR}$, may be coupled at their inputs to the anode of diode 206, while lower-voltage regulators 204 capable of tolerating an input voltage which is a diode threshold drop below that of supply voltage $V_{PWR}$ may be coupled to the cathode of diode 206, thus making such isolation of lower-voltage regulators 204 from supply voltage $V_{PWR}$ acceptable.

In some embodiments, a controllable bypass switch 208 may be in parallel with isolation diode 206, enabling bypass of isolation diode 206 (e.g., by closing of switch 208) when functionality of isolation diode 206 is not needed or desired (e.g., when not being used in a potentially explosive environment).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
    a plurality of information handling resources; and
    a power subsystem for providing electrical energy to the plurality of information handling resources, the power subsystem comprising:
        a source of electrical energy for supplying a supply voltage to an electrical node;
        a first set of one or more voltage regulators; and
        a diode coupled at its anode to the electrical node and coupled at its cathode to respective inputs of each of the first set of one or more voltage regulators in order to isolate capacitances associated with the inputs of the first set of one or more voltage regulators from the electrical node.

2. The information handling system of claim 1, further comprising a second set of one or more voltage regulators, each of the second set of one or more voltage regulators coupled at their respective inputs to the electrical node.

3. The information handling system of claim 2, wherein the second set of one or more voltage regulators are incapable of tolerating, at their respective inputs, a threshold voltage drop of the diode from the supply voltage.

4. The information handling system of claim 1, the power subsystem further comprising a switch electrically in parallel with the diode and configurable to electrically bypass the diode when the switch is closed.

5. The information handling system of claim 1, wherein the supply voltage is received as an input voltage to a liquid crystal display backlight driver.

6. The information handling system of claim 1, wherein the first set of one or more voltage regulators are capable of tolerating, at their respective inputs, a threshold voltage drop of the diode from the supply voltage.

7. A power system for providing electrical energy to a plurality of electrical components, the power system comprising:
    a source of electrical energy for supplying a supply voltage to an electrical node;
    a first set of one or more voltage regulators; and
    a diode coupled at its anode to the electrical node and coupled at its cathode to respective inputs of each of the first set of one or more voltage regulators in order to isolate capacitances associated with the inputs of the first set of one or more voltage regulators from the electrical node.

8. The power system of claim 7, further comprising a second set of one or more voltage regulators, each of the second set of one or more voltage regulators coupled at their respective inputs to the electrical node.

9. The power system of claim 8, wherein the second set of one or more voltage regulators are incapable of tolerating, at their respective inputs, a threshold voltage drop of the diode from the supply voltage.

10. The power system of claim 7, further comprising a switch electrically in parallel with the diode and configurable to electrically bypass the diode when the switch is closed.

11. The power system of claim 7, wherein the supply voltage is received as an input voltage to a liquid crystal display backlight driver.

12. The power system of claim 7, wherein the first set of one or more voltage regulators are capable of tolerating, at their respective inputs, a threshold voltage drop of the diode from the supply voltage.

13. A method comprising:
    coupling a diode at its anode to an electrical node configured to receive a supply voltage from a source of electrical energy; and
    coupling the diode at its cathode to respective inputs of each of the first set of one or more voltage regulators in order to isolate capacitances associated with the inputs of the first set of one or more voltage regulators from the electrical node.

14. The method of claim 13, further comprising coupling, at their respective inputs, a second set of one or more voltage regulators, to the electrical node.

15. The method of claim 14, wherein the second set of one or more voltage regulators are incapable of tolerating, at their respective inputs, a threshold voltage drop of the diode from the supply voltage.

16. The method of claim 13, further comprising coupling a switch electrically in parallel with the diode, wherein the switch is configurable to electrically bypass the diode when the switch is closed.

17. The method of claim 13, wherein the supply voltage is received as an input voltage to a liquid crystal display backlight driver.

18. The method of claim 13, wherein the first set of one or more voltage regulators are capable of tolerating, at their respective inputs, a threshold voltage drop of the diode from the supply voltage.

* * * * *